UNITED STATES PATENT OFFICE.

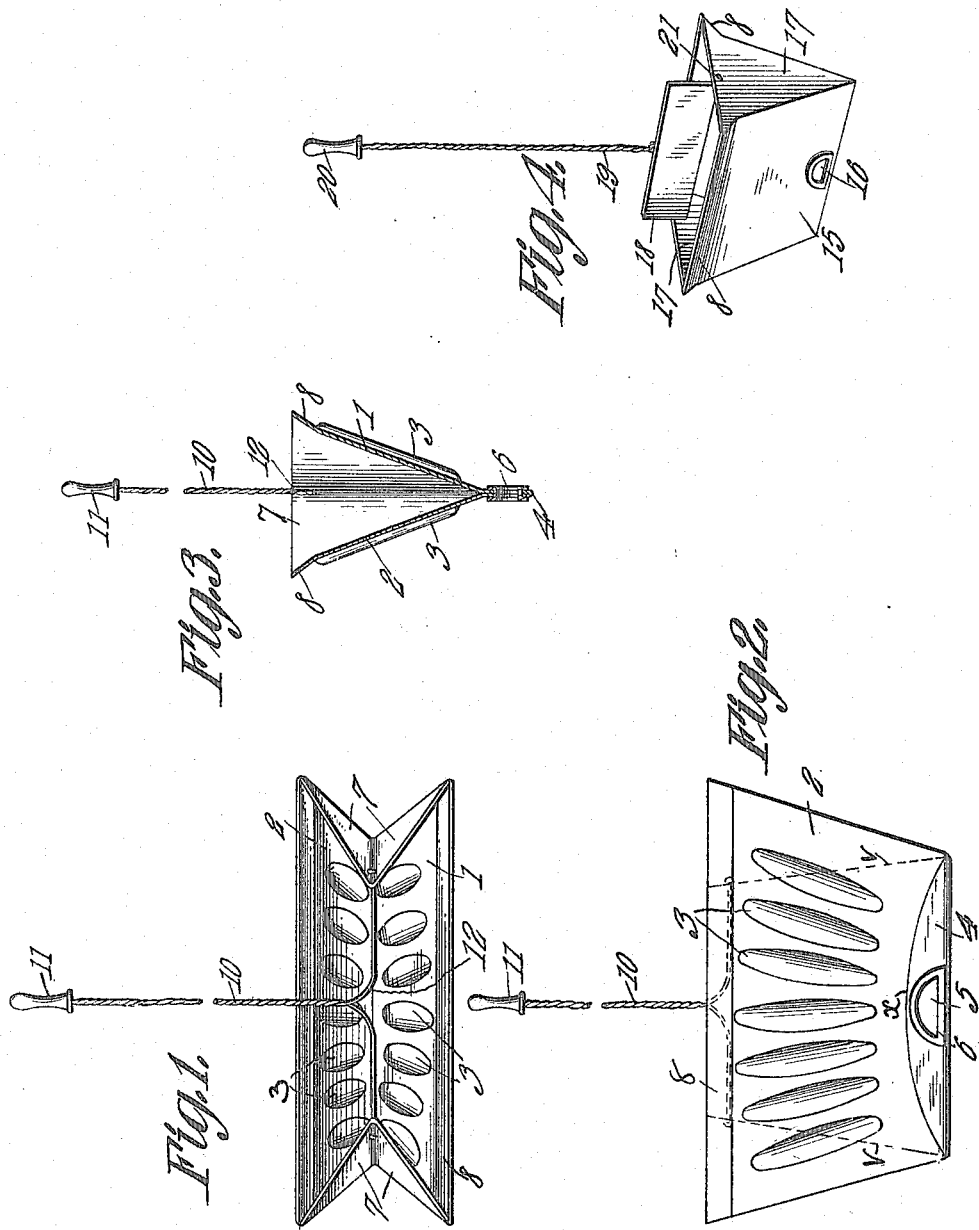

RICHARD HALDENWANG, JR., OF BROOKLYN, NEW YORK.

DUST-PAN.

1,135,519.  Specification of Letters Patent.  Patented Apr. 13, 1915.

Application filed April 21, 1913. Serial No. 762,703.

*To all whom it may concern:*

Be it known that I, RICHARD HALDEN-WANG, Jr., a citizen of the United States, and a resident of Brooklyn, in the county of Kings and State of New York, have invented certain new and useful Improvements in Dust-Pans, of which the following is a specification, reference being had to the accompanying drawings.

This invention has relation to certain new and useful improvements in household appliances and comprises a dustpan which can be held and manipulated by an operator in a standing posture; and the primary object of my invention is to provide a dustpan of this general character of a simple and inexpensive nature and of a compacted and durable construction, arranged so that the pan which is V-shaped can be tilted from side to side, and my invention comprises certain other novel arrangements as will be described more fully hereinafter.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views:

Figure 1, shows a plan view of a dustpan embodying my invention. Fig. 2, is a side view of the same. Fig. 3, shows a transverse sectional view. Fig. 4, is a perspective view showing a modification.

In my present invention I provide a dustpan which is practically duplex in that the same comprises two semi-compartments which are partially divided from one another by means of two V-shaped end walls, the construction being such that the pan may be tilted upon its edge from side to side.

In the accompanying drawings the numerals 1, and 2, represent the two sides of the V-shaped receptacle comprising the dustpan. As shown these sides are provided with the transversely extending indentations 3, which serve to strengthen the sides as well as prevent the dust from sliding out of the receptacle.

Each side 1, and 2 has its ends flanged outwardly to provide two oppositely positioned supporting lips 8, as shown in Fig. 3. As shown in Figs. 2, and 3, the receptacle has the metal at its bight portion pressed together and in Fig. 2, the curved line $x$, discloses where the metal 4 of the two sides is pressed together.

At its bight portion the pressed metal portion of the receptacle is provided with an opening 5, forming a hand-hold and the metal edge surrounding this opening is reinforced by means of the flanged strip 6, to provide a smooth handle forming opening.

The receptacle which as shown in Fig. 3, is V-shaped in cross section has its two opposite ends 7, 7, crimped inward in the form of two V-shaped walls 7, this construction being clearly shown in Fig. 1. In Fig. 2, the dotted lines V designate the inner edges of these V-shaped crimped ends 7. At their bight portions these inwardly crimped end walls 7, have suitable openings within which are pivotally held the end 12, of a T-shaped handle 10, which at its upper end is provided with the grip 11.

A dustpan constructed accordingly to my invention can be used by an operator in a standing posture in that the handle 10, is of such length that no stooping is necessary when the dust is swept into the receptacle. This construction then enables the operator to readily use an ordinary broom in conjunction with one of my dustpans. In tilting the receptacle from side to side the dust at the ends which would be likely to escape falls upon the inwardly crimped ends 7, and is so directed toward the center of the pan.

The pan, of course, can be readily carried in a pendant position by means of the handle 10.

In Fig. 4, I show a modification where I, employ a V-shaped receptacle 15, having the edge flanges 8, and the flat ends 17. In this modification I employ a half lid 18, having suitable pins 21, serving as pivots and secured to this lid 18, is the handle 19, having the grip 20. In this modification the receptacle is provided with a handle forming opening 16. It is of course understood that dustpans embodying my invention may be made in various sizes. The dustpan is further simple and inexpensive in construction and both durable and efficient in operation and the pan may be tilted from side to side with ease accuracy and despatch.

Having thus described my invention, what I claim as new and desire to secure by Letters Patent is:

1. A dust pan, comprising a V shaped receptacle including a pair of side walls having converging bottom edges, end walls formed therewith, said end walls being crimped inwardly, and a handle pivotally engaging with said end walls.

2. A dust pan, comprising a V shaped receptacle including a pair of side walls having recesses formed outwardly therein above their converging bottom edges, angularly flanged, upper edges combined with said walls, end members crimped inwardly along their center line, and a handle pivotally united to said end members.

3. A dust pan, comprising a V shaped receptacle including a pair of converging side walls having their lower portions pressed together, and a hand opening formed therein, inturned end members partially dividing said receptacle longitudinally, and a bifurcated handle having its forked ends pivotally engaged with said end members.

4. A dust pan, comprising a V shaped receptacle including a pair of side walls having convergent lower edges, a reinforcement attached to said lower edges, said reinforcement and walls having a hand hole formed therethrough, angular end members formed with said side walls, and having the angle extending inwardly therewith, and a handle having a single stem, and a bifurcated lower end, the forked extremities of which pivotally engage with said end members.

5. A dust pan comprising a V shaped receptacle, having its end walls crimped inwardly, an inverted T shaped handle having its end members pivotally engaged at the angle formed by the said end members, means for strengthening the side walls of said receptacle, said side walls being flanged downwardly at the upper edge thereof to provide oppositely positioned supporting lips.

In testimony whereof I affix my signature, in the presence of two witnesses.

RICHARD HALDENWANG, Jr.

Witnesses:
ALFRED BERNHEIM,
OSCAR BERNHEIM.

Copies of this patent may be obtained for five cents each, by addressing the "Commissioner of Patents, Washington, D. C."